(12) United States Patent
Theiler et al.

(10) Patent No.: US 11,333,550 B2
(45) Date of Patent: May 17, 2022

(54) SENSOR ARRANGEMENT AND METHOD FOR SENSOR MEASUREMENT

(71) Applicant: ams AG, Premstaetten (AT)

(72) Inventors: Helmut Theiler, Premstaetten (AT); Bernhard Greimel-Längauer, Premstaetten (AT)

(73) Assignee: AMS AG, Premstaetten (AT)

( * ) Notice: Subject to any disclaimer, the term of this patent is extended or adjusted under 35 U.S.C. 154(b) by 51 days.

(21) Appl. No.: 16/758,112

(22) PCT Filed: Oct. 22, 2018

(86) PCT No.: PCT/EP2018/078872
§ 371 (c)(1),
(2) Date: Apr. 22, 2020

(87) PCT Pub. No.: WO2019/081419
PCT Pub. Date: May 2, 2019

(65) Prior Publication Data
US 2020/0284651 A1    Sep. 10, 2020

(30) Foreign Application Priority Data
Oct. 25, 2017 (EP) .................................. 17198269

(51) Int. Cl.
*G01J 1/44* (2006.01)
*G01J 1/42* (2006.01)

(52) U.S. Cl.
CPC .............. *G01J 1/44* (2013.01); *G01J 1/4228* (2013.01); *G01J 2001/444* (2013.01); *G01J 2001/446* (2013.01); *G01J 2001/448* (2013.01)

(58) Field of Classification Search
CPC .... G06F 3/044; G01D 5/24; G01J 1/44; G01J 2001/444; G01J 2001/446
See application file for complete search history.

(56) References Cited

U.S. PATENT DOCUMENTS

| | | |
|---|---|---|
| 4,659,930 A | 4/1987 | Johnson et al. |
| 9,310,247 B2 | 4/2016 | Raynor et al. |
| 2010/0060562 A1 | 3/2010 | Hadwen et al. |
| 2011/0192958 A1 | 8/2011 | Huang et al. |
| 2013/0169295 A1* | 7/2013 | Cheong ................ G01D 5/24 324/684 |
| 2014/0267202 A1 | 9/2014 | Zheng |

(Continued)

FOREIGN PATENT DOCUMENTS

| | | |
|---|---|---|
| CN | 101589477 A | 11/2009 |
| EP | 2863192 | 4/2015 |

(Continued)

OTHER PUBLICATIONS

European Patent Office, International Search Report for PCT/EP2018/078872 dated Jan. 18, 2019.

(Continued)

*Primary Examiner* — Thanh Luu
(74) *Attorney, Agent, or Firm* — MH2 Technology Law Group LLP (57) ABSTRACT

A sensor arrangement comprises an integrator with an integrator input, a sensor coupled to the integrator input, a balancing current generator coupled to the integrator input and a compensation current generator coupled to the integrator input.

15 Claims, 2 Drawing Sheets

(56) References Cited

U.S. PATENT DOCUMENTS

2015/0102209 A1   4/2015  Xu et al.
2016/0209243 A1*  7/2016  Mcdavid .................. G01D 5/24

FOREIGN PATENT DOCUMENTS

| EP | 2996250 | 3/2016 |
| EP | 3282234 | 2/2018 |
| EP | 3285051 | 2/2018 |
| EP | 3428588 | 1/2019 |
| EP | 3428588 A1 | 1/2019 |

OTHER PUBLICATIONS

Peipei Li (CN Examiner), English Summary of Chinese First Office Action in corresponding CN Application 20188006259 1.1 dated Sep. 2, 2021, 8 pages.
Peipei Li (CN Examiner), English Translation of Chinese Search Report in corresponding CN Application 2018800625911 dated Aug. 26, 2021, 2 pages.

* cited by examiner

SENSOR ARRANGEMENT AND METHOD FOR SENSOR MEASUREMENT

CROSS-REFERENCE TO RELATED APPLICATIONS

The present application is the national stage entry of International Patent Application No. PCT/EP2018/078872, filed on Oct. 22, 2018, which claims the benefit of priority of European Patent Application No. 17198269.7, filed on Oct. 25, 2017, all of which are hereby incorporated by reference in their entirety for all purposes.

BACKGROUND OF THE INVENTION

The present disclosure is related to the field of electronics and primarily to a sensor arrangement and to a method for sensor measurement.

A sensor arrangement typically comprises a sensor that provides a sensor signal, for example in the form of a voltage or a current. The sensor signal may be provided to an amplifier, an integrator or another circuit for signal evaluation. However, high impedance sensor input stages may suffer from leakage of components connected to an input of the input stage. In some cases, the dominant component of a leakage current may be systematic.

SUMMARY OF THE INVENTION

This disclosure provides a sensor arrangement and a method for sensor measurement with reduced influence of leakage current.

The definitions as described above also apply to the following description unless otherwise stated.

In an embodiment, a sensor arrangement comprises an integrator with an integrator input, a sensor coupled to the integrator input, a balancing current generator coupled to the integrator input and a compensation current generator coupled to the integrator input.

Advantageously, the balancing current generator is configured to balance a sensor signal provided by the sensor, whereas the compensation current generator is configured to compensate a leakage current. The leakage current may e.g. originate from the integrator. The sensor arrangement may perform a compensation method of a systematic leakage component.

In an embodiment, the sensor provides a sensor current to the integrator input. Thus, the sensor is realized as a sensor element, circuit or device that provides a sensor signal in the form of a sensor current. The sensor current may have the form of a DC current, an AC current or of charge packages. For example, the sensor may be realized as a photodiode.

In an alternative embodiment, the sensor comprises a sensor element that provides a sensor voltage. The sensor may additionally comprise a switched-capacitor circuit or a voltage-to-current converter such that the sensor voltage is converted into the sensor signal in the form of a sensor current. Also in this example, the sensor provides the sensor current to the integrator input.

In an alternative embodiment, the sensor comprises a sensor element that is implemented as a capacitive sensor element. Moreover, the sensor comprises a switched-capacitor circuit that is connected to the capacitive sensor element. The switched-capacitor circuit provides the sensor signal in the form of a sensor current that may contain charge packages.

In an embodiment, during an operation phase, the balancing current generator provides a balancing current to the integrator input and the compensation current generator provides a compensation current to the integrator input. Thus, both the balancing current generator and the compensation current generator operate during the operation phase.

In an embodiment, the balancing current generator is realized as a switched-capacitor circuit.

In an embodiment, the balancing current generator is configured to provide a balancing current to the integrator input during the operation phase.

In an embodiment, the compensation current generator is realized as a switched-capacitor circuit.

In an embodiment, the compensation current generator is configured to provide a compensation current to the integrator input during the operation phase.

In an embodiment, the sensor arrangement comprises a replica current. A value of the compensation current is determined by the replica circuit. The replica circuit is coupled to an input side of the compensation current generator.

In an embodiment, the balancing current generator is realized as a switched-capacitor circuit, abbreviated SC circuit. The balancing current generator provides the balancing current in the form of at least one balancing charge package to the integrator input.

In an embodiment, the compensation current generator is realized as a SC circuit. The compensation current generator provides the compensation current in the form of at least one compensation charge package to the integrator input.

In an embodiment, during the operation phase, a balancing charge package might be larger than a compensation charge package. Each of the balancing charge packages might be larger than each of the compensation charge package.

In an embodiment, the sensor arrangement comprises a comparator with a first input coupled to an integrator output of the integrator and a second input to which a comparator reference voltage is provided.

In an embodiment, the sensor arrangement comprises a control circuit coupled to an output of the comparator and to a control input of the balancing current generator such that the balancing current generator operates depending on a comparator signal generated by the comparator. The balancing current may depend on the comparator signal. For example, the balancing current generator may provide a balancing charge package of the at least one balancing charge package depending on the comparator signal. A pulse of the comparator signal may trigger the next balancing charge package.

In an embodiment, the sensor arrangement comprises a replica circuit. The replica circuit comprises a replica integrator having a replica integrator input, a replica current generator coupled to the replica integrator input and a replica comparator. The replica comparator comprises a first input coupled to an output of the replica integrator, a second input to which a replica reference voltage is provided and an output coupled to a control input of the compensation current generator and a control input of the replica current generator.

In an embodiment, the replica current generator provides a replica compensation current to the replica integrator input. The replica current generator may generate the replica compensation current in the form of at least one replica charge package.

In an embodiment, the sensor arrangement comprises a clock generator coupled to the output of the replica comparator, to the control input of the compensation current generator and to the control input of the replica current generator such that the compensation current generator and the replica current generator operate depending on a compensation control signal generated by the clock generator and thus as a function of a replica comparator signal of the replica comparator. The compensation current and the replica compensation current may depend on the replica comparator signal. For example, the compensation current generator provides a compensation charge package of the at least one compensation charge package and the replica current generator provides a replica charge package of the at least one replica charge package depending on the compensation control signal and thus as a function of the replica comparator signal. A pulse of the replica comparator signal may trigger the next compensation charge package and the next replica charge package.

In an embodiment, a value of the compensation current and a value of the replica compensation current may be equal or may have a difference of less than 10% of the larger current. A value of the compensation charge package and a value of the replica charge package may be equal or may have a difference of less than 10% of the larger package. An average value of the compensation current and an average value of the replica compensation current may be equal or may have a difference of less than 10% of the larger current.

In an embodiment, the integrator comprises an amplifier with an amplifier input and an amplifier output. Moreover, the integrator comprises an integrating capacitor coupling the amplifier input to the amplifier output.

In an embodiment, the balancing current generator comprises a balancing capacitor, a first switch coupling a first electrode of the balancing capacitor to a reference voltage source, a second switch coupling the first electrode of the balancing capacitor to a reference potential terminal, a third switch coupling a second electrode of the balancing capacitor to the reference potential terminal and a fourth switch coupling the second electrode of the balancing capacitor to the integrator input.

In an embodiment, the compensation current generator comprises a compensating capacitor, a first switch coupling a first electrode of the compensating capacitor to a compensating voltage source, a second switch coupling the first electrode of the compensating capacitor to a reference potential terminal, a third switch coupling a second electrode of the compensating capacitor to the reference potential terminal and a fourth switch coupling the second electrode of the compensating capacitor to the integrator input.

In an embodiment, a capacitance value of the balancing capacitor might be larger than a capacitance value of the compensating capacitor.

In an embodiment, a method for sensor measurement comprises providing a sensor current to an integrator input of an integrator, providing a balancing current to the integrator input, providing a compensation current to the integrator input and integrating the sum of the sensor current, the balancing current and the compensation current by the integrator.

In an embodiment, a possible leakage current is also integrated at the integrator input. The compensation current is configured to compensate the leakage current.

The method for sensor measurement may be implemented for example by the sensor arrangement according to one of the embodiments defined above.

The method for sensor measurement may implement a systematic leakage compensation method on integrator inputs. Thus, a leakage coming from the operational amplifier input, for example a gate leakage, is the limiting leakage component in some cases and is compensated by the compensation current.

Advantageously, a compensation of this leakage component is done without an extra measurement (e.g. dark measurement for light sensors) and without a digital post processing or software subtraction. This avoids a quantization error of 2·½ LSB (LSB is the least significant bit), since there is only one measurement and not two independent measurements with the same resolution.

The disclosure describes an analog hardware solution for reducing the influence of leakage. The leakage compensation is done with a separate SC stage. This SC stage may have a much smaller LSB to fit to the leakage current to be compensated. There is no extra measurement cycle needed to extract the leakage-value, which is typically very dependent on temperature. No digital post processing or software interaction is needed to have a correct result of sensor measurement. Since the compensation is done at the same time of the sensor measurement, temperature drifts over time will not affect the compensation.

In an embodiment, the sensor arrangement allows a continuous operation since it is not interrupted by dark measurement cycles. There are no drawbacks from time-shift between a measurement and a reference- or dark-measurement, which is important with long measure cycles. The sensor arrangement has less quantization error since the leakage compensation LSB is very small.

BRIEF DESCRIPTION OF THE DRAWINGS

The following description of figures of embodiments may further illustrate and explain aspects of the sensor arrangement and the method for sensor measurement. Devices and circuit parts with the same structure and the same effect, respectively, appear with equivalent reference symbols. In so far as devices or circuit parts correspond to one another in terms of their function in different figures, the description thereof is not repeated for each of the following figures.

DETAILED DESCRIPTION

Figure 1:
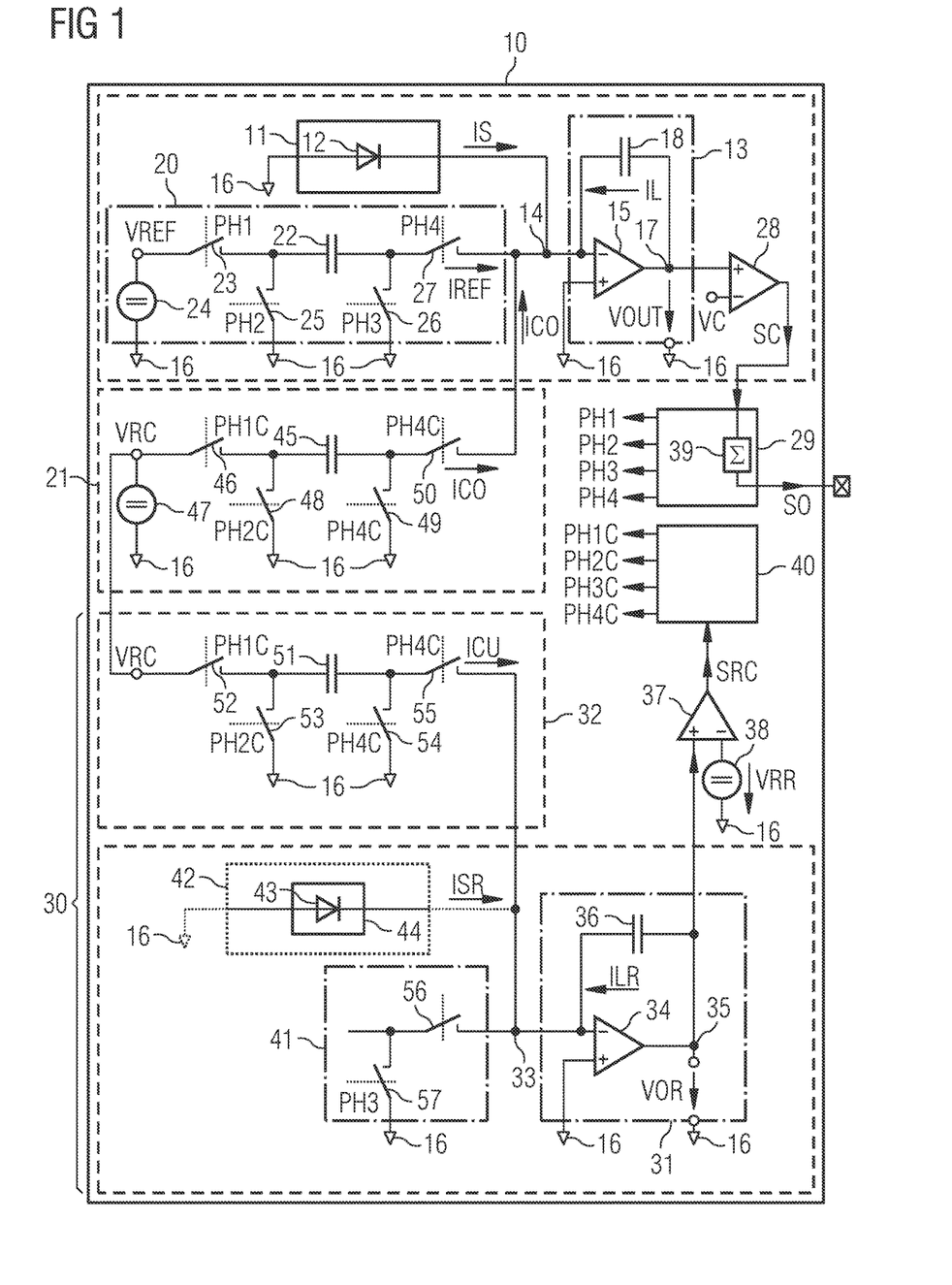
FIG. 1 shows an example of a sensor arrangement.

FIG. 1 shows an example of a sensor arrangement 10 comprising a sensor 11. The sensor 11 may be fabricated as a photodiode 12. Additionally, the sensor arrangement 10 comprises an integrator 13 with an integrator input 14. The photodiode 12 couples the integrator input 14 to a reference potential terminal 16. The integrator 13 comprises an amplifier 15. A first input of the amplifier 15 is connected to the integrator input 14. A second input of the amplifier 15 is connected to the reference potential terminal 16. The second input of the amplifier 15 is connected to a further input of the integrator 13. The further input of the integrator 13 is connected to the reference potential terminal 16. An output of the amplifier 15 is coupled via an integrating capacitor 18 of the integrator 13 to the first input of the amplifier 15. The output of the amplifier 15 is connected to an integrator output 17 of the integrator 13.

The first input of the amplifier 15 may be realized as an inverting input and the second input of the amplifier 15 may be implemented as a non-inverting input. The amplifier 15 may be realized as a transconductance amplifier. Alternatively, the amplifier 15 is fabricated as an operational amplifier.

Additionally, the sensor arrangement 10 comprises a balancing current generator 20 that is coupled or connected on its output side to the integrator input 14. The balancing current generator 20 is realized as a switched-capacitor circuit, abbreviated SC circuit. The balancing current generator 20 comprises a balancing capacitor 22, a first switch 23 coupling a first electrode of the balancing capacitor 22 to a reference voltage source 24, a second switch 25 coupling the first electrode of the balancing capacitor 22 to the reference potential terminal 16, a third switch 26 coupling a second electrode of the balancing capacitor 22 to the reference potential terminal 16 and a fourth switch 27 coupling the second electrode of the balancing capacitor 22 to the integrator input 14.

Furthermore, the sensor arrangement 10 comprises a compensation current generator 21 that is coupled or connected on its output side to the integrator input 14. The compensation current generator 21 is implemented as a SC circuit. The output of the amplifier 15 and thus the integrator output 17 of the integrator 13 is coupled to an input of a comparator 28 of the sensor arrangement 10. An output of the comparator 28 is coupled to an input of a control circuit 29 of the sensor arrangement 10. The control circuit 29 comprises a counter 39 and a clock form generator. The output of the comparator 28 is coupled to an input of the counter 39 and the clock form generator for the balancing current generator 20. The series connection of the integrator 13, the comparator 28 and the balancing current generator 20 may be named quantizer.

Additionally, the sensor arrangement 10 comprises a replica circuit 30. The replica circuit 30 comprises a replica integrator 31 and a replica current generator 32. The replica integrator 31 is implemented such as the integrator 13. The realization of the replica integrator 31 may be identical with the realization of the integrator 13. The replica integrator 31 comprises a replica integrator input 33. An output of the replica current generator 32 is coupled to the replica integrator input 33. The replica current generator 32 is fabricated in the same way as the compensation current generator 21.

Moreover, the replica integrator 31 comprises a replica amplifier 34 having a first input connected to the replica integrator input 33. A second input of the replica amplifier 34 is connected to the reference potential terminal 16. An output of the replica amplifier 34 is coupled via a replica integrating capacitor 36 to the first input of the replica amplifier 34. The output of the replica amplifier 34 is connected to a replica integrator output 35 of the replica integrator 31. The first input of the replica amplifier 34 is realized as an inverting input and the second input of the replica amplifier 34 is realized as a non-inverting input.

Furthermore, the replica circuit 30 comprises a replica comparator 37 having an input connected to the replica integrator output 35. A replica comparator voltage source 38 is connected to a second input of the replica comparator 37. The sensor arrangement 10 comprises a clock generator 40 that is connected on its input side to an output of the replica comparator 37. On its output side, the clock generator 40 is connected to the input side of the compensation current generator 21 and to the input side of the replica current generator 32. The clock generator 40 can be realized as clock form generator. Additionally, the replica circuit 30 comprises a replica balancing circuit 41 that is connected on its output side to the replica integrator input 33.

The replica circuit 30 may comprise a replica sensor 42 coupled on its output side to the replica integrator input 33. The replica sensor 42 may comprise a replica photodiode 43.

A shield 44 may cover the replica photodiode 43 such that light is not absorbed by the replica photodiode 43. The shield 44 may be realized as a metallic film of a semiconductor body. The semiconductor body comprises the sensor arrangement 10. The light shield 44 of the replica sensor 42 may be realized by a metal layer on top of the replica photodiode 43. Thus, the replica photodiode 43 is shielded on-chip. The replica photodiode 43 couples the replica integrator input 33 to the reference potential terminal 16. The replica photodiode 43 may be realized as a shielded replica photodiode.

The compensation current generator 21 comprises a compensating capacitor 45, a first switch 46 coupling a first electrode of the compensating capacitor 45 to a compensating voltage source 47, a second switch 48 coupling the first electrode of the compensating capacitor 45 to the reference potential terminal 16, a third switch 49 coupling a second electrode of the compensating capacitor 45 to the reference potential terminal 16 and a fourth switch 50 coupling the second electrode of the compensating capacitor 45 to the integrator input 14.

Correspondingly, the replica current generator 32 comprises a replica capacitor 51, a first switch 52 coupling a first electrode of the replica capacitor 51 to the compensating voltage source 47, a second switch 53 coupling the first electrode of the replica capacitor 51 to the reference potential terminal 16, a third switch 54 coupling a second electrode of the replica capacitor 51 to the reference potential terminal 16 and a fourth switch 55 coupling the second electrode of the replica capacitor 51 to the replica integrator input 33.

The replica balancing circuit 41 comprises a replica switch 56 coupled to the replica integrator input 33 and a further replica switch 57 coupling the replica switch 56 to the reference potential terminal 16. The replica switch 56 of the replica channel is turned off permanently. The replica switch 56 is included to have a leakage current generated by this switch in the replica channel included.

The sensor 11 provides a sensor current IS to the integrator input 14. Furthermore, the balancing circuit 20 provides a balancing current IREF to the integrator input 14. The balancing current IREF may have the form of balancing charge packages or pulses. Additionally, the compensation current generator 21 generates a compensation current ICO to the integrator input 14. The compensation current ICO may have the form of compensation charge packages or pulses. The integrator 13 may generate a leakage current IL that may also be provided to the integrator input 14. The leakage current IL may flow through the first input of the amplifier 15. The charge conservation at the integrator input 14 results in the following equation:

$$Q = \int (IS + IREF + ICO + IL)dt$$

wherein Q is a charge stored at an electrode of the integrating capacitor 18, IS a value of the sensor current, IREF is a value of the balancing current, ICO is a value of the compensation current and IL is a value of the leakage current. The charge Q stored at the integrating capacitor 18 results in an output voltage VOUT of the integrator 13. The output voltage VOUT is provided to the comparator 28. A comparator signal SC of the comparator 28 is provided to the control circuit 29.

The control circuit 29 generates control signals PH1 to PH4 to the balancing current generator 20. If the output voltage VOUT is higher than a comparator reference voltage VC at the second input of the comparator 28, the control circuit 29 controls the balancing current generator 20 such that the balancing current generator 20 generates a balancing charge package or pulse. Thus, the balancing current IREF comprises a pulse or a balancing charge package triggered by a pulse of the comparator signal SC. The balancing current IREF has an opposite sign in comparison to the sensor current IS. The counter 39 counts the pulses of the comparator signal SC during a predetermined integration time. An output signal SO of the counter 39 is a function of the parameter measured by the sensor 11, e.g. is a function of the light received by the photodiode 12. The output signal SO of the counter 39 provides the result of the measurement. The output signal SO is the digitized value of the sensor current IS.

The sensor current IS is continuously, or nearly continuously, provided to the integrator input 14 during an operation phase. At a pulse or balancing charge package of the balancing current IREF, the output voltage VOUT is decreased and drops below the comparator reference voltage VC.

The compensation current generator 21 may generate the compensation current ICO independent of the generation of the balancing current IREF by the balancing current generator 20. The compensation current ICO has a value equal to the leakage current IL. Since the compensation current ICO has the form of pulses or compensation charge packages, an average value of the compensation current ICO is equal to the leakage current IL.

The value of the compensation current ICO is determined by the replica circuit 30. The replica current generator 32 generates a replica compensation current ICU that is provided to the replica integrator input 33. The replica compensation current ICU may be provided in the form of at least one replica charge package. Moreover, a replica leakage current ILR is provided to the replica integrator input 33. The replica leakage current ILR may be generated by the replica integrator 31 and the replica balancing circuit 41. Additionally, the replica sensor 42 may generate a replica sensor leakage current ISR that flows to the replica integrator input 33. The replica sensor leakage current ISR may be a leakage current.

The compensating voltage source 47 generates a compensating reference voltage VRC. The compensating reference voltage VRC is applied to the compensation current generator 21 and to the replica current generator 32. The capacitance value of the compensating capacitor 45 and the capacitance value of the replica capacitor 51 are equal. Thus, the compensation charge package and the replica charge package have an equal charge value.

Due to charge conversation at the replica integrator input 33, a charge generated at the replica integrating capacitor 36 can be calculated according to the following equation:

$$Q=\int(ISR+ICU+ILR)dt$$

wherein Q is the charge stored in the replica integrating capacitor 36, ISR is a value of a replica sensor leakage current provided by the replica sensor 42, ICU is a value of the replica compensation current and ILR is a value of the replica leakage current.

It can be assumed that the replica leakage current ILR is equal or is approximately equal to the leakage current IL. The replica integrator 31 generates a replica output voltage VOR that is provided to the replica comparator 37. The replica comparator 37 generates a replica comparator signal SRC as a function of the comparison of the replica output voltage VOR and a replica reference voltage VRR provided by the replica voltage source 38. If the replica output voltage VOR is higher than the replica reference voltage VRR, the replica comparator 37 generates the replica comparator signal SRC with a value such that the clock generator 40 triggers a compensation charge package or pulse in the compensation current ICO and a replica charge package or pulse in the replica compensation current ICU.

The replica compensation current ICU compensates the replica leakage current ILR and the replica sensor leakage current ISR. Since the circuit parts of the replica circuit 30 are identical with the circuit parts in the sensor arrangement 10 that are used for integrating the sensor current IS, the leakage currents ILR, IL may be equal or approximately equal such that the compensation current ICO is able to compensate the leakage current IL and a possible leakage current of the sensor 11 provided to the integrator input 14. The replica reference voltage VRR may be equal to the comparator reference voltage VC or smaller or larger.

Thus, the leakage current IL is continuously compensated during operation. In case of a temperature change that results in a change of the leakage current IL, the change is detected by the replica circuit 30 and results in a change of the compensation current ICO. Thus, an influence of temperature on the output voltage VOUT of the integrator 13 is greatly reduced.

The balancing current generator 20 generates the balancing current IREF using the following steps: In a first phase, the balancing capacitor 22 gets charged to a reference voltage VREF via activation of a first control signal PH1 and a third control signal PH3 at the same time or discharged via activation of a second control signal PH2 and the third control signal PH3 at the same time. The reference voltage VREF is provided by the reference voltage source 24.

In a second phase, the balancing capacitor 22 transfers charge to the integrator input 14 by activation of the second control signal PH2 and a fourth control signal PH4 at the same time or by activation of the first control signal PH1 and the fourth control signal PH4 at the same time. The two modes or phases described define the polarity of the charge transferred to the integrator 13.

Activation of the first control signal PH1 means that the first switch 22 is set in a conducting state. Correspondingly, activation of the second to the fourth control signal PH2 to PH4 means that the second to the fourth switch 25 to 27 is set in a conducting state.

In the first phase, the first control signal PH1 sets the first switch 23 and the third control signal PH3 sets the third switch 26 in a conducting state, or the second control signal PH2 sets the second switch 25 and the third control signal PH3 sets the third switch 26 in a conducting state. The other switches may be set in a non-conducting state. Thus, the balancing capacitor 22 is charged by the reference voltage VREF or discharged.

In the second phase, the second switch 25 is set in a conducting state by the second control signal PH2 and the fourth switch 27 is set in a conducting state by the fourth control signal PH4, or the first switch 23 is set in a conducting state by the first control signal PH1 and the fourth switch 27 is set in a conducting state by the fourth control signal PH4. The other switches may be set in a non-conducting state. Thus, the voltage at the balancing capacitor 22 is provided between the comparator input 14 and the reference potential terminal 16 or the reference voltage source 24. The balancing capacitor 22 provides one balancing charge package to the integrator input 14.

In a further first phase that follows the second phase, the switches 23, 25, 26, 27 are set such as in the first phase. A further second phase that is equal to the second phase follows the further first phase and so on. In an example, the first and the third control signal PH1, PH3 may be equal. Also the second and the fourth control signal PH2, PH4 may be equal. The compensation current generator 31 and the replica current generator 32 operate in a similar manner as the balancing current generator 20 for generating charge packages.

The sensor arrangement 10 is implemented as a quantizer input stage with extra SC input current for leakage compensation controlled by the replica circuit 30 or replica stage.

In FIG. 1, an example for a quantizer-input using an integrator stage 13 as a core element is shown. This stage 13 may work with a direct input from the sensor 11 with a current output or switched-capacitor derived input current from a sensor 11 with a voltage output. There may be a direct reference current or a switched-capacitor input current IREF from a reference voltage VREF controlled by the quantizer output bit-stream SC to balance the sensor current IS to the integrating capacitor 18.

Any unwanted leakage current IL to the integrating capacitor 18 also gets balanced by the compensation current generator 21 and, thus, an error in the output SC, SO of the quantizer 28, 29, 20, 13 is reduced. A compensation of this error source is advantageous, since sensor interfaces get more and more sensitive to advance precision of measurements. The sensor arrangement 10 compensates the unwanted leakage current with a special circuit arrangement comprising the replica circuit 30.

The sensor arrangement 10 adds the compensation current ICO, equivalent to the leakage IL with an inverted sign for compensation. A SC stage 21 with the compensation reference voltage VRC and the switched compensation capacitor 45 adds the compensation current ICO to the integrator input 14. This separate generation has the advantage of sizing the D/A charge-portion to the maximum amount of leakage that must be compensated. A further advantage is that the compensation does not affect the main delta-sigma loop at all. The bit-stream used for the leakage current compensation is derived from a replica 31 of the integrator stage 13 without sensor input current and without quantizer input current. All elements that are candidates for systematic leakage injection to the replica integrator input 33 that may be named a node 33 are inside the replica 30.

For applications where the sensor can get shielded, the shielded sensor 42 can be part of the replica circuit 30 as well (e.g. optical interfaces with covered sensor 42).

The sensor arrangement 10 realizes a leakage compensation arrangement with an integrator replica stage 31. The sensor arrangement 10 provides a continuous compensation of systematic leakage to the integrator input 13. The sensor arrangement 10 uses the SC compensation circuit 21 with a specially-fitted LSB, wherein the LSB is independent from the main quantizer 28. The sensor arrangement 10 operates without the need for a reference or dark-measurement and post-processing. The sensor arrangement 10 uses the SC compensation circuit 21, giving the advantage of a main quantizer ranging without impact on the leakage compensation.

The balancing current generator 20 is configured to provide the balancing current IREF which corresponds to the digital result number of the analog-to-digital conversion, especially of the analog-to-digital conversion of the sensor current IS into the output signal SO. The compensation current generator 21 is configured to provide the compensation current ICO to the integrator input 14. The compensation current ICO corresponds to the current that flows in the replica circuit 30 to the integrator input 33 of the replica circuit 30, especially e.g. in order to compensate leakage current and/or other unwanted or disturbing current.

In an alternative embodiment, the replica circuit 30 is free of the replica sensor 42. Thus, the charge Q can be calculated with the following equation:

$$Q = \int ((ICU + IL)) dt$$

In an alternative not-shown embodiment, at least a further integration stage or a filter stage may be arranged between the integrator 13 and the comparator 28.

Figure 2:
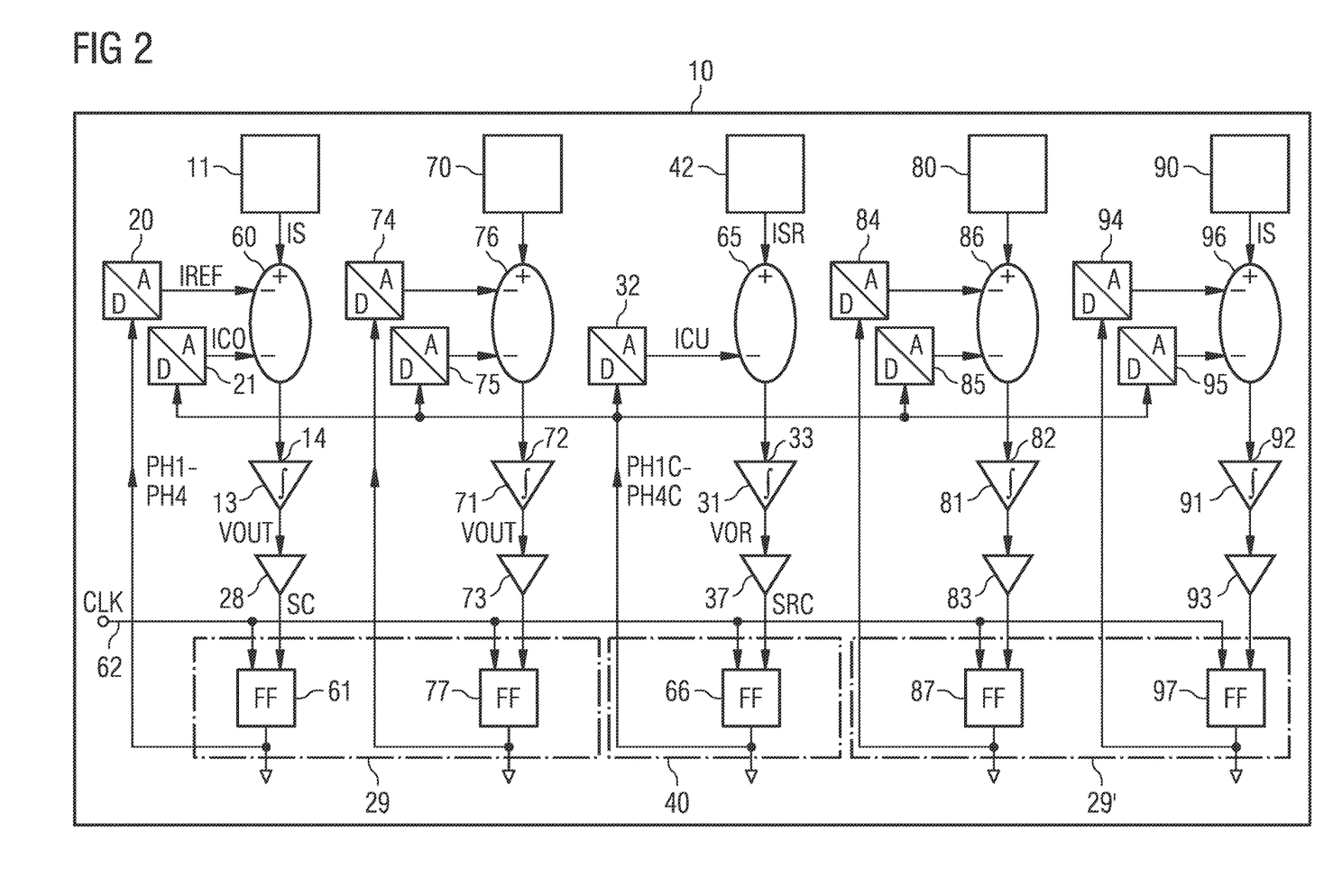
FIG. 2 shows a further example of a sensor arrangement comprising more than one sensor.

FIG. 2 shows an example of the sensor arrangement 10 that is a further development of the example shown in FIG. 1. The sensor arrangement 10 comprises a summation node 60 that is connected to the integrator input 14. The sensor 11 is coupled via the summation node 60 to the integrator input 14. Additionally, the balancing current generator 20 is coupled via the summation node 60 to the integrator input 14. The balancing current generator 20 is realized as a digital-to-analog converter. Correspondingly, the compensation current generator 21 is coupled via the summation node 60 to the integrator input 14. Also the compensation current generator 21 is realized as a digital-to-analog converter. The integrator 13 having the integrator input 14 is coupled via the comparator 28 to the control circuit 29. The control circuit 29 comprises a flip-flop 61 which is connected on its input side to the output of the comparator 28. A second input of the flip-flop 61 is connected to a clock signal line 62. An output of the flip-flop 61 is coupled to the control terminal of the balancing current generator 20.

The sensor 11, the balancing current generator 20 and the compensation current generator 21 are connected to inputs of the summation node 60. The balancing current generator 20 and the compensation current generator 21 may be connected to inverting inputs of the summation node 60. The sensor 11 may be connected to a non-inverting input of the summation node 60. The summation node 60 may be realized as an additive mixer, an analog adder circuit, a summing amplifier, an analog subtractor, a differential amplifier or as a simple node realized by a connection of connecting lines, such as shown in FIG. 1.

Additionally, the sensor arrangement 10 comprises a replica summation node 65 that is connected to the replica integrator input 33. The replica sensor 42 is coupled via the replica summation node 65 to the replica integrator input 33. The replica sensor 42 is realized e.g. as a shielded replica sensor. The replica current generator 32 is implemented as a digital-to-analog converter. The replica current generator 32 is coupled via the replica summation node 65 to the replica integrator input 33. The replica integrator 31 having the replica integrator input 33 is coupled via the replica comparator 37 to the clock generator 40. The clock generator 40 comprises a replica flip-flop 66. The clock signal line 62 is also connected to a further input of the replica flip-flop 66. An output of the replica flip-flop 66 is connected to the control input of the replica current generator 32 and to the control input of the compensation current generator 21.

The replica sensor 42 and the replica current generator 32 are connected to inputs of the replica summation node 65. The replica sensor 42 is fabricated e.g. as a shielded replica sensor. The replica current generator 32 may be connected to an inverting input of the replica summation node 65. The replica sensor 42 may be connected to a non-inverting input of the replica summation node 65. The replica summation node 65 may be realized as an additive mixer, an analog adder circuit, a summing amplifier, an analog subtractor, a differential amplifier or as a simple node realized by a connection of connecting lines, such as shown in FIG. 1.

Additionally, the sensor arrangement 10 comprises a second sensor 70, a second integrator 71 with a second integrator input 72, a second comparator 73, a second balancing current generator 74 and a second compensation current generator 75 that are connected to each other such as the sensor 11, the integrator 13, the comparator 28, the balancing current generator 20 and the compensation current generator 21 shown in FIG. 1 or 2. The sensor arrangement 10 may comprise a second summation node 76 arranged such as the summation node 60 shown in FIG. 2. The control circuit 29 comprises a second flip-flop 77 connected in the same way as the flip-flop 61.

Additionally, the sensor arrangement 10 comprises a third sensor 80, a third integrator 81 with a third integrator input 82, a third comparator 83, a third balancing current generator 84 and a third compensation current generator 85 that are connected to each other such as the sensor 11, the integrator 13, the comparator 28, the balancing current generator 20 and the compensation current generator 21 shown in FIG. 1 or 2. The sensor arrangement 10 may comprise a third summation node 86 arranged such as the summation node 60 shown in FIG. 2. A further control circuit 29' comprises a third flip-flop 87 connected in the same way as the flip-flop 61. The further control circuit 29' is connected to the control circuit 29.

Furthermore, the sensor arrangement 10 comprises a fourth sensor 90, a fourth integrator 91 with a fourth integrator input 92, a fourth comparator 93, a fourth balancing current generator 94 and a fourth compensation current generator 95 that are connected to each other such as the sensor 11, the integrator 13, the comparator 28, the balancing current generator 20 and the compensation current generator 21 shown in FIG. 1 or 2. The sensor arrangement 10 may comprise a fourth summation node 96 arranged such as the summation node 60 shown in FIG. 2. The further control circuit 29' comprises a fourth flip-flop 97 connected in the same way as the flip-flop 61. The clock generator 40 is connected to the control inputs of the compensation current generator 21 and the second to the fourth compensation current generator 75, 85, 95.

The sensor 11 and the second to the fourth sensor 70, 80, 90 may be sensitive to the same part of the electromagnetic spectrum, e.g. to the same part of ultraviolet radiation, visible radiation or infrared radiation. For example, the sensor 11 may be sensitive to red light, the second sensor 70 may be sensitive to green light and the third sensor 80 may be sensitive to blue light. The fourth sensor 90 may be sensitive to each light. The replica sensor 42 is only used for leakage compensation. The replica sensor 42 is shielded by a light-impermeable layer from the ambient light.

A clock signal CLK is provided to the second input of the flip-flops 61, 66, 77, 87, 97. The output signals of the flip-flop 61 and of the second to the fourth flip-flop 77, 87, 97 are provided to the respective balancing current generators 20, 74, 84, 94. However, the output signals of the flip-flop 61 and of the second to the fourth flip-flop 77, 87, 97 are a function of the sensor currents IS of the sensor 11 and of the second to the fourth sensor 70, 80, 90. Said output signals are used to generate the measurement results of the four sensors 11, 70, 80, 90. The output signal of the replica flip-flop 66 is provided to the replica current generator 32 and also to the compensation current generator 21 and the second to the fourth compensation current generator 75, 85, 95. Thus, one replica circuit 30 is sufficient for reducing the influence of leakage current in the measurement path of the sensor 11 and of the second to the fourth sensor 70, 80, 90.

In FIG. 2, the sensor arrangement 10 comprises a sensor array 11, 70, 80, 90 for true-color sensing with leakage compensation using a separate bit-stream to special suited D/A cells controlled by a replica channel. The sensor arrangement 10 provides leakage compensated bit-stream outputs for red, green, blue and unfiltered light sensors 11, 70, 80, 90.

The sensor arrangement 10 implements a true color sensor arrangement with four active channels. The optical sensor arrangement 10 provides a high resolution, because it may be desired to place the light sensors 11, 70, 80, 90 behind a display. The display greatly reduces the light coming to the sensors 11, 70, 80, 90. For the same resolution, the electronics must have a larger gain. This increased gain amplifies the error signals as well.

The light sensor arrangement 10 now has a number of channels for true color and special sensing. Optical filters on top of the sensors 11, 70, 80, 90 define the special range of wavelength for each channel. The sensing element of the sensors 11, 70, 80, 90 is normally a diode such as a photodiode. For each channel, a sensor-diode and a quantizer is available. To get rid of the systematic leakage current, one dark-channel or replica circuit 30 is inserted to extract the leakage. The systematic leakage of all channels can be compensated by the bit-stream from this dark-channel or replica circuit 30.

In an alternative embodiment, not shown, the sensor 11 and the second to the fourth sensor 70, 80, 90 may be sensitive to the same part of the electromagnetic spectrum, e.g. to the same part of ultraviolet radiation, visible radiation or infrared radiation.

Whereas the number of sensors 11, 70, 80, 90 of the sensor arrangement 10 in FIG. 1 is exactly one, the number of sensors 11, 70, 80, 90 of the sensor arrangement 10 in FIG. 2 is exactly four. In alternative embodiments, not shown, the number of sensors 11, 70, 80, 90 of the sensor arrangement 10 may be exactly two, three or more than four. For example, the number of sensors 11, 70, 80, 90 of the sensor arrangement 10 may be at least one or two or three or four. The replica sensor 42 is not counted in said number due to the shield 44.

The invention claimed is:

1. A sensor arrangement, comprising
an integrator with an integrator input,
a sensor coupled to the integrator input,
a balancing current generator coupled to the integrator input and
a compensation current generator coupled to the integrator input, wherein
during an operation phase, the balancing current generator is configured to provide a balancing current to the integrator input and the compensation current generator is configured to provide a compensation current to the integrator input,
the balancing current generator is realized as a switched-capacitor circuit and the compensation current generator is realized as a switched-capacitor circuit, and
a value of the compensation current is determined by a replica circuit.

2. The sensor arrangement according to claim 1, wherein the sensor is configured to provide a sensor current to the integrator input.

3. The sensor arrangement according to claim 1, wherein the balancing current generator is configured to provide the balancing current in the form of at least one balancing charge package to the integrator input during the operation phase.

4. The sensor arrangement according to claim 1,
wherein the compensation current generator is configured to provide the compensation current in the form of at least one compensation charge package to the integrator input during the operation phase.

5. The sensor arrangement according to one of claim 1, comprising
a comparator with a first input coupled to an integrator output of the integrator and a second input to which a comparator reference voltage is provided and
a control circuit coupled to an output of the comparator and to a control input of the balancing current generator such that the balancing current generator operates depending on a comparator signal generated by the comparator.

6. The sensor arrangement according to claim 1, comprising a replica circuit comprising
a replica integrator having a replica integrator input,
a replica current generator coupled to the replica integrator input and
a replica comparator with a first input coupled to a replica integrator output of the replica integrator, a second input to which a replica reference voltage is provided and an output coupled to a control input of the compensation current generator and a control input of the replica current generator.

7. The sensor arrangement according to claim 6, comprising
a clock generator coupled to the output of the replica comparator, to the control input of the compensation current generator and to the control input of the replica current generator such that the compensation current generator and the replica current generator are both configured to operate depending on a compensation control signal generated by the clock generator.

8. The sensor arrangement according to claim 6,
wherein a value of a compensation current provided by the compensation current generator and a value of a replica compensation current provided by the replica current generator have a difference of less than 10%.

9. The sensor arrangement according to claim 6, wherein the replica circuit comprises a replica sensor.

10. The sensor arrangement according to claim 9, wherein the replica sensor comprises a replica photodiode.

11. The sensor arrangement according to claim 10, wherein a shield covers the replica photodiode.

12. The sensor arrangement according to claim 1, wherein the balancing current generator comprises
a balancing capacitor,
a first switch coupling a first electrode of the balancing capacitor to a reference voltage source,
a second switch coupling the first electrode of the balancing capacitor to a reference potential terminal,
a third switch coupling a second electrode of the balancing capacitor to the reference potential terminal and
a fourth switch coupling the second electrode of the balancing capacitor to the integrator input.

13. The sensor arrangement according to claim 1, wherein the compensating current generator comprises
a compensation capacitor,
a first switch coupling a first electrode of the compensating capacitor to a compensating voltage source,
a second switch coupling the first electrode of the compensating capacitor to a reference potential terminal,
a third switch coupling a second electrode of the compensating capacitor to the reference potential terminal and
a fourth switch coupling the second electrode of the compensating capacitor to the integrator input.

14. The sensor arrangement according to claim 1, wherein the sensor is realized as a photodiode.

15. A method for sensor measurement, comprising
providing a sensor current to an integrator input of an integrator,
providing a balancing current to the integrator input,
providing a compensation current to the integrator input and
integrating the sum of the sensor current, the balancing current and the compensation current by the integrator, wherein
during an operation phase, a balancing current generator provides the balancing current to the integrator input and a compensation current generator provides the compensation current to the integrator input,
the balancing current generator is realized as a switched-capacitor circuit and the compensation current generator is realized as a switched-capacitor circuit, and
a value of the compensation current is determined by a replica circuit.

* * * * *